United States Patent Office 3,408,120
Patented Oct. 29, 1968

---

3,408,120
MOUNTING OF RODS OR SPINDLES
Ronald Goodacre, Basingstoke, England, assignor to Lansing Bagnall Limited, Basingstoke, England, a British company
Original application June 1, 1966, Ser. No. 554,434, now Patent No. 3,358,791, dated Dec. 19, 1967. Divided and this application June 19, 1967, Ser. No. 647,035
5 Claims. (Cl. 308—15)

ABSTRACT OF THE DISCLOSURE

A rod or spindle is mounted within a split housing having a clamping pin or bolt for closing the housing onto the rod or spindle, the rod or spindle having a circumferential groove which is tangentially engaged by the clamping pin or bolt whereby rotation of the rod or spindle in the housing, when unclamped, results in longitudinal adjusting movement of the rod or spindle.

This application is a division of my application Ser. No. 554,434, filed June 1, 1966 for Industrial Lift Trucks, now Patent No. 3,358,791 of Dec. 19, 1967.

---

This invention relates to the mounting of rods or spindles and provides, in combination, a rod or spindle having a circumferential groove of which at least a part follows a helical path, a split housing in which the rod or spindle is mounted for rotation, a clamping pin or bolt operable to close the housing into clamping engagement with the rod or spindle, which pin or bolt projects into the bore of the housing and engages tangentially the said helical part of the circumferential groove of the rod or spindle whereby rotation of the rod or spindle in the housing, when unclamped, results in longitudinal adjusting movement of the rod or spindle.

Preferably the groove comprises a single endless circumferential groove that is oblique to the axis of the rod or spindle at the helix angle of the said helical path.

In one form of the invention the rod or spindle comprises a stub shaft having one end mounted for rotation in the split housing and the other end mounted in a bearing for a roller, the lateral position of the roller being determined by longitudinal adjustment of the stub shaft in the split housing.

Two diametrically opposed sockets are preferably provided in one end of the rod or spindle, which sockets comprise means whereby the rod or spindle may be rotated to effect longitudinal adjustment of the rod or spindle within the housing.

Figure 1:
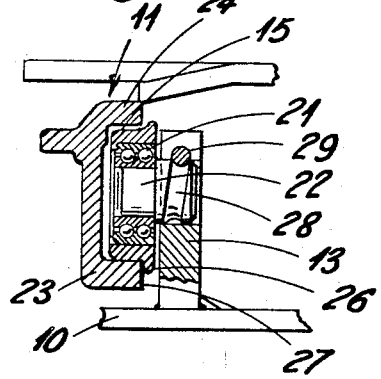
Figure 2:
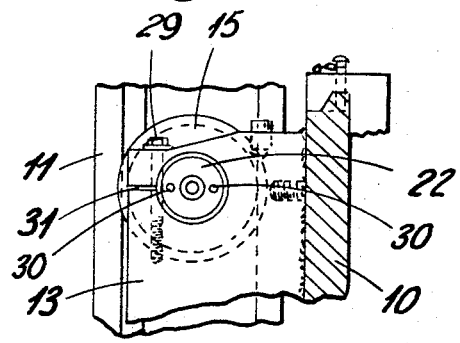

By way of example, an embodiment in accordance with the invention will now be described with reference to the accompanying drawings in which:

FIGURE 1 is a cross-sectional view of a roller and a mounting therefor, the roller being slidable along a channel; and FIGURE 2 is an end view of the roller and its mounting as shown in FIGURE 1.

In the specification of our U.S. Patent 3,358,791, there is described an industrial truck having a load lifting carriage 10 which is capable of being raised and lowered on a pair of upright channel guide members 11 or mast. These guide members 11 are braced together in parallel spaced relation one with the other and have their channels facing each other for engagement by two pairs of rollers mounted on bars secured to the back side of the lifting carriage. These rollers allow for relative vertical movement between the carriage and the mast.

The roller shown in the drawings of this specification is one of the rollers 15, which roller has a flange 26 for engagement with the edge 27 of the forward flange 23 of the guide member 11, the rear flange 24 of the guide member being cut back as shown.

The roller 15 is mounted on a ball bearing 21 which is in turn mounted on a spindle or stub shaft 22 fixed to the associated bar 13 secured to the lifting carriage, the spindle 22 being held against rotation relative to the bar by the fact that the bar 13 is provided with a slot 31 to constitute a split housing for the spindle, and a clamping bolt 29 which when tightened closes the split housing onto the spindle and thereby locks the spindle against rotation relative to the bar 13.

However, so that the lateral position of the roller 15 can be accurately adjusted until the flange 26 of the roller engages, but does not bind with, the edge 27 of the guide member 11, the spindle 22 is provided with a circumferential groove 28 of which at least a part follows a helical path. In this example, the groove is a single endless groove oblique to the axis of the spindle at the helix angle of the said helical part. This groove is tangentially engaged by the aforesaid clamping bolt 29 for the split housing 31 whereby, when the clamping bolt is loosened, rotation of the spindle will effect longitudinal movement of the spindle with respect to the clamping pin and the split housing, and hence adjustment of the lateral position of the roller. The end surface of the end of the spindle 22 which is furthest from the roller is provided with two diametrically opposed sockets 30 which sockets comprise means whereby the spindle may be so rotated. The clamping bolt may then be retightened to lock the spindle in its new position. It is preferred that, as shown in the drawing, the groove is arcuate in cross-section and has the same radius of curvature as the radius of that part of the bolt which engages the groove.

I claim:
1. In combination a rod or spindle having a circumferential groove of which at least a part follows a helical path, a split housing in which the rod or spindle is mounted for rotation, a clamping pin or bolt operable to close the housing into clamping engagement with the rod or spindle, which pin or bolt projects into the bore of the housing and engages tangentially the said helical part of the circumferential groove of the rod or spindle whereby rotation of the rod or spindle in the housing, when unclamped, results in longitudinal adjusting movement of the rod or spindle.

2. The combination as claimed in claim 1 in which the groove comprises a single endless circumferential groove that is oblique to the axis of the rod or spindle at the helix angle of the said helical path.

3. The combination as claimed in claim 1 in which the groove is of arcuate form in cross-section and has the same radius of curvature as the radius of the portion of the pin or bolt which engages the groove.

4. The combination as claimed in claim 1 in which the rod or spindle comprises a stub shaft having one end mounted for rotation in the split housing and the other end mounted in a bearing for a roller, the lateral position of the roller being determined by longitudinal adjustment of the stub shaft in the split housing.

5. The combination as claimed in claim 1 in which at least two diametrically opposed sockets are provided in one end of the rod or spindle, which sockets comprise means whereby the rod or spindle may be rotated to effect longitudinal adjustment of the rod or spindle within the housing.

References Cited

UNITED STATES PATENTS

| 2,928,696 | 3/1960 | Hiers | 308—3.8 |
| 2,952,495 | 9/1960 | Herr | 308—15 |
| 3,024,629 | 3/1962 | Raskhodoff | 287—52.08 X |

MARTIN P. SCHWADRON, *Primary Examiner.*

CARROLL B. DORITY, Jr., *Assistant Examiner.*